March 28, 1967  J. D. RAMSEY  3,311,397
RESILIENT BUMPERS FOR VEHICLES
Filed Feb. 9, 1966  2 Sheets-Sheet 2
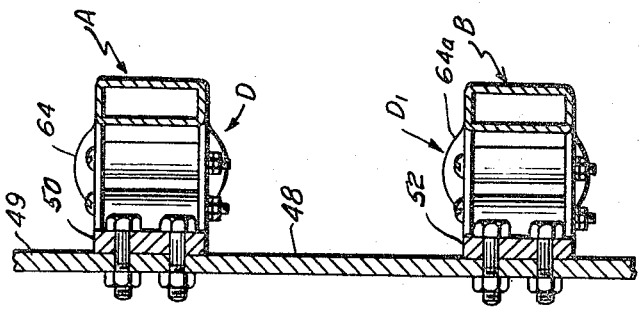
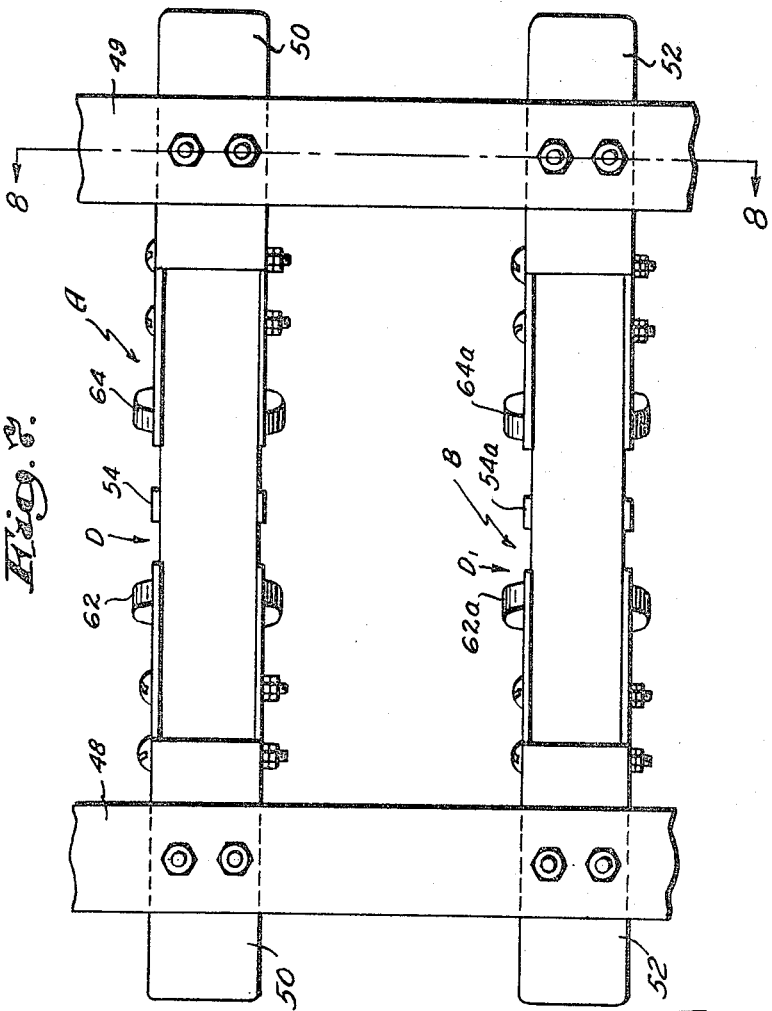
Inventor:
Joseph D. Ramsey,
By Munn H. Hamilton
Attorney United States Patent Office
3,311,397
Patented Mar. 28, 1967

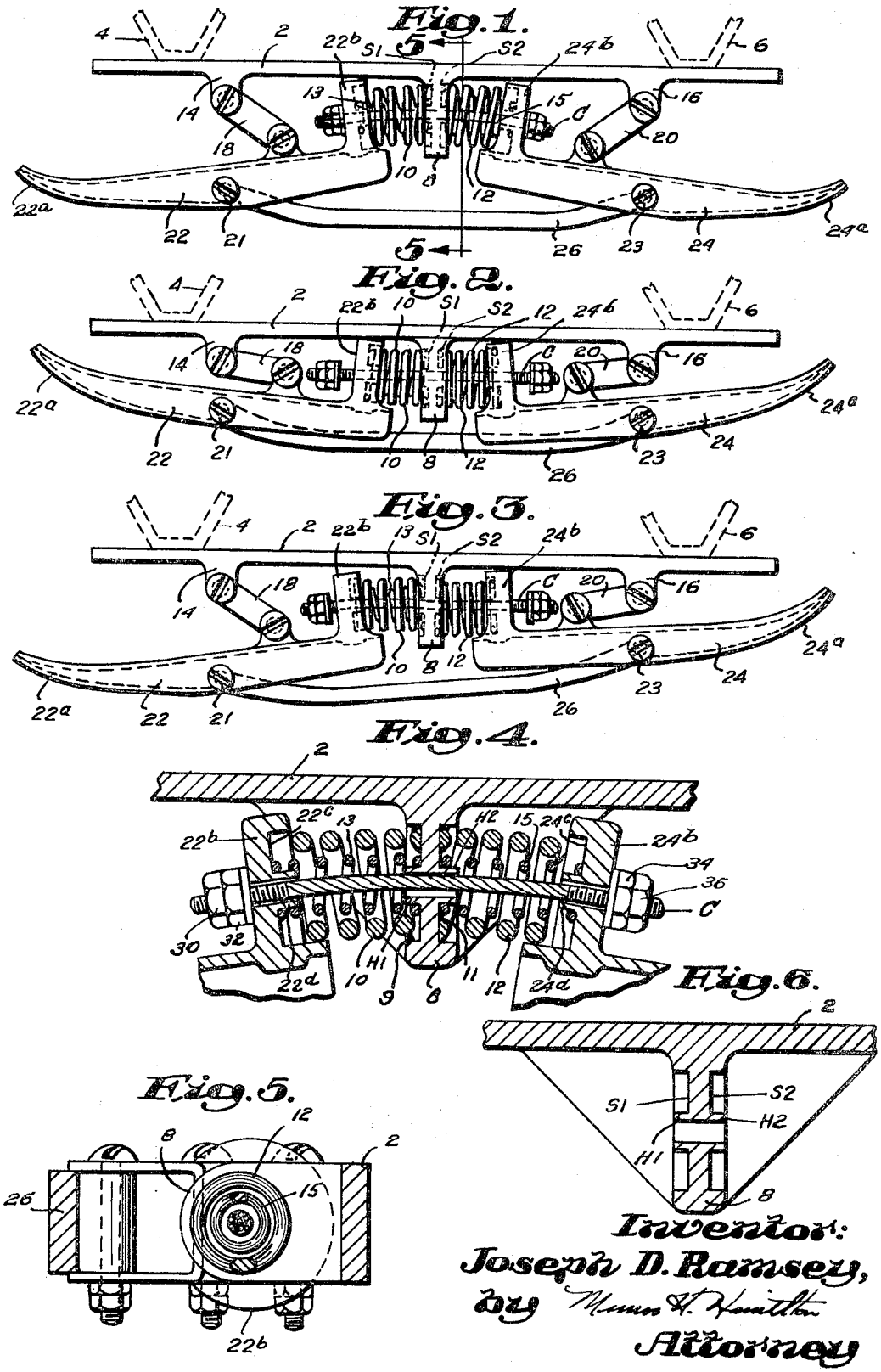

3,311,397
RESILIENT BUMPERS FOR VEHICLES
Joseph D. Ramsey, 19 Westland Road,
Watertown, Mass. 02172
Filed Feb. 9, 1966, Ser. No. 526,140
4 Claims. (Cl. 293—84)

This invention relates to an improved automobile bumper construction in which a plurality of bumper sections are combined with one another in such a manner as to comprise a highly efficient shock-absorbing or cushioning device for absorbing impact forces resulting from vehicle collision.

A bumper construction of this general character has been disclosed and claimed in Patent No. 3,120,973 issued to me on Feb. 11, 1964, and the present invention is an improved form of the bumper device disclosed in the patent and objects of the present application are similar to those set forth in the patent noted.

It is a specific object of the present invention, however, to increase the cushioning characteristics of multiple bumper sections secured together in spring-loaded relationship.

A further specific object of the invention is to provide a combination of lever arms and shackle members in which is combined a multiple spring arrangement arranged so as to provide for impact forces being progressively absorbed in successive stages of cushioning action.

The nature of the invention and its other objects and novel features will be more fully understood and appreciated from the following description of a preferred embodiment of the invention selected for purposes of illustration and shown in the accompanying drawings, in which:

FIGURE 1 is a plan view showing the bumper construction of the invention in a fully extended position;

FIGURE 2 is a plan view showing the bumper in a fully compacted position;

FIGURE 3 is a plan view showing the bumper construction with one side thereof in a compacted position and the other side in an extended position;

FIGURE 4 is a fragmentary plan construction showing more clearly inner and outer spring components in arranged relationship;

FIGURE 5 is a cross section taken on the line 5—5 of FIGURE 1;

FIGURE 6 is a detail cross sectional view showing a portion of a spring-retaining body portion formed with spring retaining seats;

FIGURE 7 is an elevational view of a modified form of the invention; and

FIGURE 8 is a cross section taken on the line 8—8 of FIGURE 7.

In general, the bumper construction of the present invention combines with the spring-loaded cushioning linkage of Patent No. 3,120,973, issued Feb. 11, 1964, concentrically arranged secondary springs which are located in such a position that shock or impact forces may be absorbed in two progressive stages and with resistance forces exerted in the second stage being much greater than resistance forces exerted in the first stage.

Referring more in detail to the drawings, numeral 2 denotes an elongated rigid frame piece which may, for example, consist of a steel bar of rectangular cross section and of a length suitable for extending across the front end or rear end of an automobile. It is intended that the frame piece 2 be secured to the body of an automobile in a raised position by means of suitable brackets or arms 4 and 6 indicated in broken lines in FIGURE 1.

As noted in FIGURE 1 the frame piece 2 is formed with a central spring-retaining body portion 8 having an opening formed therethrough. The spring-retaining ring portion 8 is formed at either side with ring-shaped seats S1 and S2 and centrally located hubs H1 and H2 which are more clearly shown in FIGURES 4 and 6.

Mounted around outer circumferential portions of the seats S1 and S2 are two relatively large coiled springs 10 and 12 which have respective ends thereof solidly secured to adjacent seat surfaces by some suitable means as welding or the like, indicated at 9 and 11 in FIGURE 4. The outer ends of the springs 10 and 12 are unsupported. Arranged concentrically within the relatively large coiled springs 10 and 12 are two relatively small coiled springs 13 and 15 which are of a diameter chosen to engage around and over the hub portion H1 and H2 respectively. These relatively small springs are of an axial length greater than the axial length of the relatively larger coiled springs 10 and 12 so that the outer ends of springs 13 and 15 project beyond springs 10 and 12 as may be seen from an inspection of FIGURE 4. The concentric springs 10 and 13 on one side of the central spring retaining body or ring portion 8 form with concentric springs 12 and 15 on the other side of said ring portion 8 shock absorbing spring assemblies.

At the inner edge of the frame piece 2, at either side of the spring retaining portion 8, are provided lug portions 14 and 16 which have pivotally supported thereon a pair of shackle units 18 and 20 respectively. The opposite ends of the shackle units are pivotally attached to bumper side sections 22 and 24 which in turn have attached therebetween at part points 21 and 23 a bumper center bar 26.

Both the center bar 26 and the side sections 22 and 24 are of relatively heavy construction designed to withstand hard usage, and outer ends of the side sections are curved at 22a and 24a and project beyond the respective ends of the frame piece 2 in a protectively arranged position. At their inner extremities the bumper side sections 22 and 24 are formed with spring-engaging extensions 22b and 24b which are of annular form and provided with recessed seating surfaces 22c and 24c, and centrally located hub portions 22d and 24d as is more clearly shown in FIGURE 4.

These spring-engaging extremities 22b and 24b are normally supported by the bumper sections and shackles above-noted in a position to engage the ends of respective spring extremities 13 and 15 and as shown in FIGURE 4 the spring extremities fit snugly around the hub portions 22d and 24d and rest against the seating surfaces 22c and 24c. Thus the springs 13 and 15 are engaged at their outer ends in a position to be compressed and to become extended with movement of members 22 and 24.

The extensions 22b and 24b are maintained against the ends of springs 13 and 15 by means of a retaining element consisting of a cord C located through the springs and the member 8. The outer ends of the cord C are threaded to receive nuts as 30, 32, 34 and 36 which are threaded snugly against adjacent surfaces of the parts 22b and 24b.

The relatively small springs 13 and 15 in the position illustrated in FIGURE 1 are tightly compressed while the relatively large springs are not compressed. In this arrangement of the springs the bumper sections are pivoted on the pivot members 21 and 23 so that the sections project outwardly in an angularly extending manner as noted in FIGURE 1. In this position either of the bumper side sections 22 or 24, when contacted independently, may be forced inwardly against the resistance of a respective relatively small spring member. For example, the bumper section 24 is shown forced inwardly in FIGURE 3 without any change in position of the side section 22. In this case the force acting on the side section 24 is initially adsorbed by the spring 15. After the section 24 moves inwardly a very slight distance the spring-engaging part 24b comes into contact with the larger spring 12. At this point shock force is absorbed by the combined resistance of this spring 12 and the spring 15 already in a partly compacted state. Thus it will be apparent that a very desirable two-stage cushioning action takes place in which the relatively light resistance of spring 15 is first overcome and shortly thereafter as the resistance of this spring increases an additional and greatly increased resistance of the larger spring is encountered and a highly efficient cushioning and absorption of shock forces may be realized.

In FIGURE 2 the two bumper sections 22 and 24 are shown together with the center bar 26 in a compressed state resulting from a force acting substantially at right angles to the center bar 26. In this case the force is absorbed in a different manner since the force acts through both of the pivots 21 and 23 displacing these members inwardly and thereby simultaneously compressing in successive stages the first pair of springs 13 and 15 and then the second pair of springs 10 and 12 which affords a compounded resistance of very effective nature for receiving and absorbing a sudden shock force such as results from vehicle impact.

In this type of displacement a very large force can be absorbed with a very small displacement since there is a relatively long lever action employed through which the impact force must act. It should be observed that the long lever action is derived from the particular arrangement of the center bar and side sections being pivotally connected as shown with each of the side sections pivoted on shackle members and with each of the side sections being adapted to successively engage the springs 13 and 15 and through the springs 10 and 12.

From the foregoing description of the invention it will be seen that I have provided a multi-spring bumper construction which is capable of absorbing shock forces of very large magnitude within a very short displacement distance utilizing a two-stage spring cushioning means of simplified nature.

The structure shown in FIGURES 1-6 inclusive is intended to be illustrative of one preferred form, but may be modified in various respects and in FIGURES 7 and 8, I have illustrated one other such modification. As shown therein, I provide a multiple bumper component consisting of vertical bars 48 and 49 and upper and lower frame pieces 50 and 52 which are of the same general construction as that of frame piece 2 and each of which have supported thereon upper and lower bumper assemblies generally denoted by arrows A and B. Upper bumper assembly includes a front bumper section 54 and side bumper sections 62 and 64. The lower bumper assembly includes a front bumper section 54a and side bumper sections 62a and 64a. Each of the two bumper assemblies A and B have the same shock absorbing spring assemblies, the bumper side sections 22 and 24 interconnected by the cord C and the bumper center bar 26 shown in FIGURE 1. These shock absorbing spring assemblies D and D1 are generally indicated in FIGURES 7 and 8.

The forms of the invention shown in the drawings are capable of modification in various other ways within the scope of the appended claims.

I claim:

1. An improved bumper construction comprising an elongated rigid frame piece adapted to be supported at one end of an automobile above ground level and presenting a right angularly disposed medial body portion having its opposite sides thereof formed with annular spring retaining recesses and central stud portions extending out of the recesses, a pair of relatively large coiled spring elements mounted in respective annular spring-retaining recesses and solidly secured thereto in opposed relationship to one another such that the axis of contraction and extension of the spring elements extends substantially parallel to the longitudinal axis of the frame piece, the outer extremities of said relatively large springs being unsupported, a second pair of relatively small coiled springs located concentrically within the large springs and engaged over respective central stud portions of said spring retaining recesses, a pair of bumper side sections, respective side section shackle members pivotally attached to the frame piece, said shackle members extending angularly away from the frame piece and being pivotally attached to the bumper side sections to yieldably support the bumper side sections in spaced relation to the frame piece, a bumper central section having its opposite ends pivotally connected to each of the said bumper side sections about independent pivot pins transversely located through the bumper side sections at points in close proximity to the said shackle members, said pivoted bumper side sections further being constructed with right angularly disposed extensions for receiving outer ends of said second pair of relatively small coiled springs and having openings formed therethrough, said small coiled springs occurring in a normally compressed state to resiliently hold respective bumper side sections in an angularly disposed position between the bumper central section and the said frame piece, a holding element extending through each of the springs and the medial body portion, said holding element having opposite extremities thereof anchored through the right angularly disposed extensions of the bumper side sections to secure the pair of relatively small springs to relative side sections whereby the said side sections may be displaced against the resistance of the small springs through a limited arc of travel and against the resistance of the large springs through a further limited arc of travel.

2. A structure according to claim 1 in which the said extensions of the pivoted bumper side sections are normally secured in spaced relation to the unsupported ends of the relatively large coiled spring members.

3. A structure according to claim 2 in which the holding element consists of a cord which is received through both pairs of spring members.

4. A structure according to claim 1 in which the relatively large coil springs are secured to the medial body portion by means of welding.

References Cited by the Examiner

UNITED STATES PATENTS

| 212,688 | 2/1879 | Hansell | 267—1 X |
| 1,372,839 | 3/1921 | Solomon | 293—85 |
| 1,564,204 | 12/1925 | Clark | 293—97 |
| 1,645,723 | 10/1927 | Schmidt | 293—97 X |
| 3,120,973 | 2/1964 | Ramsey | 293—84 |

FOREIGN PATENTS

| 663,329 | 4/1929 | France. |

ARTHUR L. LA POINT, *Primary Examiner.*

H. BELTRAN, *Assistant Examiner.*